Jan. 6, 1925.
W. F. VOGEL ET AL
PLOWSHARE
Filed Jan. 25, 1922
1,522,350
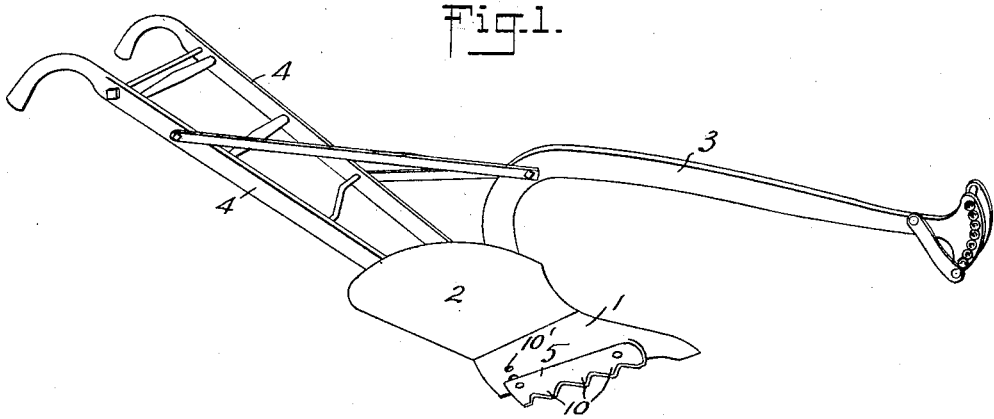
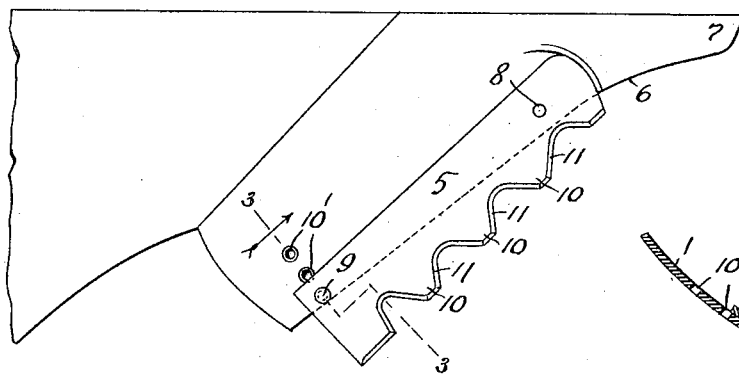
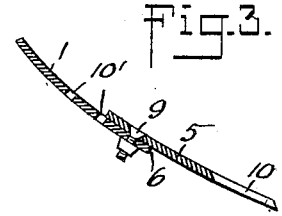
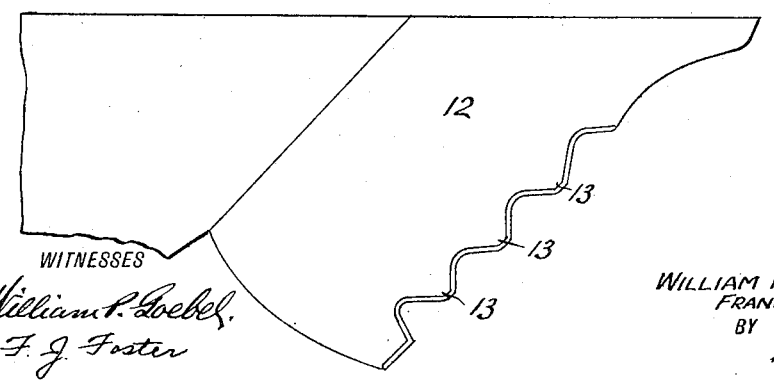
WITNESSES
INVENTOR
WILLIAM F. VOGEL
FRANK LALANDE
BY
ATTORNEYS Patented Jan. 6, 1925.

1,522,350

UNITED STATES PATENT OFFICE.

WILLIAM F. VOGEL AND FRANK LALANDE, OF CHALLIS, IDAHO.

PLOWSHARE.

Application filed January 25, 1922. Serial No. 531,749.

*To all whom it may concern:*

Be it known that we, WILLIAM F. VOGEL and FRANK LALANDE, citizens of the United States, and residents of Challis, in the county of Custer and State of Idaho, have invented new and useful Improvements in Plowshares, of which the following is a full, clear, and exact description.

This invention relates to improvements in plowshares, an object of the invention being to provide a plowshare especially designed for cutting roots of a tough and fibrous character, such as are commonly found in certain portions of the western United States and in other localities where the soil is partly of volcanic formation and has to be irrigated before plowing.

After soil of this character has been irrigated, the roots of alfalfa plants and other growing plants become very tough and hard to cut. An object of this invention, therefore, as above suggested, is to provide a plow particularly adapted for this kind of work.

A further object is to provide a plow which will be simple and practical in construction, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 1 is a perspective view of a plow equipped with a plowshare embodying our invention;

Figure 2 is an enlarged fragmentary top plan view of the plowshare;

Figure 3 is a sectional view on the staggered line 3—3 of Figure 2; and

Figure 4 is a view similar to Figure 2, illustrating a slight modification.

Referring in detail to Figures 1, 2 and 3 of the drawings, we have indicated at 1, a plowshare which forms a part of the usual plow construction, including a mold board 2, plow beam 3 and handles 4. The invention in this case resides in the provision of means either integral with or associated with the plowshare for cutting roots and similar obstructions.

Referring particularly to Figure 2 of the drawings, it will be seen that a toothed cutting member 5 is removably attached to the shearing or cutting edge 6 of the plowshare at a slight distance behind the plow point 7. The member 5 is preferably curved longitudinally in accordance with the curve of the shearing edge of the plowshare. A bolt 8 is utilized in securing the forward end of the attachment to the plowshare and the other end of the attachment is removably secured to the plowshare by a bolt or other securing device 9 passed through an opening in the attachment and selectively engageable in any one of a series of openings 10' in the plowshare. This construction permits the rear end of the attachment to be swung in order to effect angular adjustment of the teeth 10 thereof. It is to be noted that the cutting edges 11 of the teeth are located at various angles so that clogging of the teeth is unlikely to occur.

In Figure 4 of the drawings we have illustrated a slight modification, wherein the plowshare is formed with a series of integral teeth 13 along its cutting or shearing edge. These teeth are constructed in substantially the same manner as the teeth of the attachment 5, the only difference being that they are not angularly adjustable as in the above described embodiment of the invention.

In either instance the teeth serve to effectively cut buried roots and the different angles of the cutting edges of the teeth prevent the clogging of obstructions on the plowshare.

Various slight changes and alterations might be made in the general form and arrangement of the parts described without departing from our invention, and hence we do not wish to limit ourselves to the precise details set forth, but shall consider ourselves at liberty to make such slight changes and alterations as fairly fall within the spirit and scope of the appended claims.

We claim:

The combination with a plowshare, including a plow point and a shearing edge, said share having a series of openings arranged transversely thereof at the end opposite said point; of a cutting attachment comprising a toothed plate extending longitudinally of said shearing edge and abutting the same throughout the length of said plate, said plate being pivoted at one end to said share adjacent the point thereof, and means engageable with the other end of said attachment and with any one of said series of openings for securing said attachment in various angular positions with respect to said shearing edge.

WILLIAM F. VOGEL.
FRANK LALANDE.